United States Patent Office — 2,992,273, Patented July 11, 1961

2,992,273
PREPARATION OF DENSE CALCIUM PANTOTHENATE

Roland Kapp, East Orange, and Richard Griffith, Middletown, N.J., assignors to Nopco Chemical Company, Harrison, N.J., a corporation of New Jersey
No Drawing. Filed Mar. 12, 1958, Ser. No. 720,817
11 Claims. (Cl. 260—534)

This invention relates to the preparation of calcium pantothenate having improved properties. More particularly this invention relates to a process for increasing the bulk density of calcium pantothenate.

Calcium pantothenate is a well known compound having utility as a vitamin. It is generally prepared by reacting $\alpha$-hydroxy-$\beta,\beta$-dimethyl-$\gamma$-butyrolactone with calcium $\beta$-alanate. Subsequently, during the purification of calcium pantothenate, an aqueous solution thereof is concentrated and precipitated with cold isopropanol whereupon a hard cake is formed which is chopped out of its container, pressed to remove solvent and subsequently dried. The recovered calcium pantothenate is a light, fluffy powder having a low bulk density of about 0.3 gram per cc. Because of its low bulk density it is extremely difficult to handle in such packaging operations as capsule preparation. Frequently in plant runs, the pH after drying of the product exceeds the upper limit of the U.S.P. specification which calls for a pH of from 7 to 9.

Accordingly, it is an object of our invention to prepare calcium pantothenate having increased bulk density. It is a further object to prepare calcium pantothenate in a manner whereby the pH of the product does not rise above U.S.P. specifications upon drying. Another object is to prepare a slurry of high density calcium pantothenate which is sufficiently fluid so as to freely flow through the various lines of the equipment e.g., for subsequent centrifuging treatment in contradistinction to the formation of the aforesaid precipitated cake. Further objects will become apparent from the detailed description given hereinafter. It is intended, however, that the detailed description and specific examples do not limit the invention, but merely indicate preferred embodiments thereof since various changes and modifications within the scope of the invention will become apparent to those skilled in the art.

The above and other objects have been unexpectedly accomplished in the following manner. A three component solution is prepared which comprises d- or l-calcium pantothenate dissolved in an aqueous organic solvent therefor. The solvent contains water plus a first liquid organic material which is miscible with water but which is a non-solvent for calcium pantothenate per se. A preferred method for preparing this three component solution is to concentrate an aqueous calcium pantothenate solution to a syrup and then dilute the syrup with the first organic liquid. The resulting three component aqueous organic solution of d- or l-calcium pantothenate is thereafter brought into intimate contact i.e., by agitation, with a second liquid organic material miscible with said aqueous organic solvent but which, in addition, is a non-solvent for d- and l-calcium pantothenate. The second liquid organic material may or may not be miscible with water per se. Upon contact of the three component solution with the second liquid organic material, a slurry of dense d- or l-calcium pantothenate is precipitated. Optionally, additional agitation may be carried out after the dense calcium pantothenate has been precipitated. The advantage of such auxiliary agitation would be to break up any lumps of the precipitated material that may be present so that a smooth slurry of the dense calcium pantothenate is obtained. The resulting product which may be recovered in any convenient manner, as by filtration or centrifuging followed by drying, has a high bulk density e.g., from about 0.6 to about 0.75 gram per cc. The pH upon drying does not rise significantly and is within the range required by U.S.P. specifications. Upon microscopic examination, the product appears as small spheres in contradistinction to the long needles of the low bulk density product. This procedure may be conveniently carried out upon impure or partially purified d- or l-calcium pantothenate or upon pure d- or l-calcium pantothenate.

We are not positive what theory explains the formation of the desirable properties of calcium pantothenate obtained by our process. We believe that the explanation may lie in the fact that the second liquid organic material which is a non-solvent for calcium pantothenate is able to coextract both the water and the first liquid organic material thereby permitting the calcium pantothenate to precipitate out in a form resulting in a high density product.

It is known according to U.S. Patent No. 2,717,267, Garbarini, September 6, 1955, to prepare calcium pantothenate having increased bulk density by a process of pasting or agitating a slurry of calcium pantothenate crystals. Our process, on the contrary, increases bulk density by precipitating calcium pantothenate which has been dissolved in an aqueous organic solvent therefor e.g., aqueous isopropanol, with a liquid material miscible with the solvent but immiscible with the salt. This distinction is especially clear since the aforementioned patent makes use of water to adjust the consistency of the calcium pantothenate slurry whereas we dissolve calcium pantothenate in an equeous organic solvent. Stirring or any other dispersing means is utilized to bring about intimate contact between the aqueous organic calcium pantothenate solution and the added liquid organic material in view of the difference in the densities of the solution and added material. Otherwise, upon contact the solution and added material will rapidly settle into two layers and precipitation will not occur. Indeed, vigorous agitation for the purpose of interspersing the aqueous organic solution of calcium pantothenate and the second organic material is highly desirable in order to bring about precipitation. It is clear, however, that the employment of stirring or any other dispersing means is not carried out for the same purpose as taught by the prior art which is to act upon calcium pantothenate crystals per se. We make use of stirring or other dispersing means in order to bring about intimate contact between the two liquid phases which have dissimilar densities so that precipitation of the dense salt may be accomplished.

When the three component solution of pure or impure calcium pantothenate is prepared, there is present from about 20% to 30% of water based upon the weight of the calcium panthothenate. As stated before a preferred procedure involves concentrating an aqueous calcium pantothenate solution to a syrup which then contains about 20% to 30% water. The amount of the first liquid organic material added is usually from 300% to 500% by weight of the calcium panthothenate. This addition which is usually made at temperatures of about 40° to 80° C., results in a thin syrupy solution. Other useful liquid organic materials are methanol and methyl Cellosolve (ethylene glycol monomethyl ether). These materials are not limiting since other liquid organic materials may be used which are miscible both with said second liquid organic material and water while at the same time are immiscible and inert with respect to calcium pantothenate per se. It is to this aqueous organic solution of calcium panthothenate that the second liquid organic material is added, usually in an amount of from 50% to 100% by weight of the aqueous organic solution. The order of addition of the solution and the second liquid organic material with regard to each other is immaterial since they are subsequently interspersed.

Examples of the second class of liquid organic materials which may be used in our invention are hexane, benzene, acetone, isopropyl acetate and methyl ethyl ketone. The recited materials are not limiting since other liquid organic materials may be used successfully which are miscible with the aqueous organic solvent for calcium pantothenate while at the same time are immiscible and inert with regard to calcium pantothenate. Of course, use of all of these solvents does not necessarily increase the bulk density to the same degree. For instance, use of methyl ethyl ketone (Example VI) does bring about an advantageous increase, although it is not a preferred material.

It should be noted that while methanol is an example of said first organic liquid and hexane is an example of said second organic liquid, these two materials are not used together because they are immiscible with respect to each other. Under such circumstances, these materials will not satisfy all of the conditions of the process viz., that the second organic liquid be miscible with the aqueous organic solvent for calcium pantothenate.

When partially purified d- or l-calcium pantothenate is used, it may be first treated to remove excess calcium by dissolving in water and introducing carbon dioxide at about 50° to 60° C. to precipitate the excess calcium as calcium carbonate. If desired, treatment with silica gel or a cation exchange resin such as sulfonated coal (Zeocarb H) may be used for the same purpose. After the removal of excess calcium ions, the aqueous solution of d-calcium pantothenate is usually filtered and concentrated to a syrup by heating in vacuo. This syrup is then diluted with the first liquid organic material and the dense d-calcium pantothenate precipitated therefrom by the addition of the second liquid organic material. The resulting slurry containing the precipitated dense d-calcium pantothenate may then be conveniently transferred via pipes or the like directly to a centrifuge for removing excess liquid. This material is finally dried at e.g., 60° C.

For a fuller understanding of the nature and objects of this invention, reference may be had to the following examples which are given merely as illustrations of the invention and are not to be construed in a limiting sense.

Example I 100 grams of an aqueous solution of partially purified d-calcium panthothenate containing about 50 grams of calcium pantothenate were concentrated by heating in vacuo until the solution weighed 76 grams. The material which was a syrup was then diluted with 250 ml. of warm isopropanol (about 60° C.), whereupon a clear solution was obtained. This solution was immediately diluted with 250 ml. of hexane added all at once while stirring. A gum first formed but was dispelled in the hexane. Upon continued stirring, a smooth slurry of precipitated calcium pantothenate was obtained. It was cooled to room temperature, centrifuged, and the solids recovered and dried. In this manner 49.5 grams of d-calcium pantothenate having a bulk density of 0.67 gram per cc. were obtained.

Example II

The above procedure was repeated except that in this instance the isopropanol solution of d-calcium pantothenate was slowly added to the 250 ml. of hexane which was stirred rapidly. Work up as in the preceding example yielded 51 grams of d-calcium panthothenate having a bulk density of 0.64 gram per cc.

Example III

The procedure of Example I was followed except that in this instance the concentrated aqueous solution of d-calcium panthothenate weighed 83 grams. This was first diluted with 250 ml. of warm isopropanol and then diluted with 100 ml. hexane. The solution was seeded to induce precipitation and immediately thereafter diluted with an additional 150 ml. hexane. A smooth transition from dispersed gum to crystalline slurry was observed when compared with the procedure of Example I. Stirring was employed throughout the procedure to obtain the slurry of dense d-calcium panthothenate. A yield of 51.2 grams of d-calcium panthothenate having a bulk density of 0.77 gram per cc. was obtained.

Example IV 100 grams of an aqueous solution of d-calcium pantothenate containing about 48 grams of calcium pantothenate were concentrated in vacuo until 68.5 grams of solution were obtained. This solution was then diluted with 200 ml. of warm isopropanol and then diluted while stirring with 130 ml. of benzene. When solids appeared, an additional 70 ml. of benzene were added. The slurry was stirred until thoroughly broken up, centrifuged, washed with benzene and dried. The yield of d-calcium pantothenate was 45.7 grams, the bulk density 0.71 gram per cc., and the pH 7.22.

Example V

Example IV was repeated except that the aqueous isopropanol solution of d-calcium pantothenate was treated with 130 ml. of isopropyl acetate in lieu of benzene. In this manner 45.2 grams of d-calcium pantothenate having a bulk density of 0.49 gram per cc. and a pH of 7.45 was recovered.

Example VI

Example IV was repeated except in this instance 200 ml. of methyl ethyl ketone were used in lieu of benzene. 47 grams of d-calcium pantothenate were obtained having a bulk density of 0.42 gram per cc. and a pH of 7.69.

Example VII 100 grams of impure d-calcium pantothenate containing some methanol were dissolved in 100 ml. of water and stirred for one hour with 2 grams of Zeocarb H in order to remove excess calcium which was present as calcium β-alanate. The solution was filtered to remove the ion exchange material and the filtrate concentrated to 84 grams by heating in vacuo. Thereafter 150 ml. of warm isopropanol were added and the d-calcium pantothenate precipitated by the addition of 150 ml. of hexane with stirring. 57.1 grams of d-calcium pantothenate having a bulk density of 0.72 gram per cc. and a pH of 7.60 were recovered.

Example VIII 40 grams of impure d-calcium pantothenate dissolved in 100 ml. of distilled water were treated with carbon dioxide for ½ hour at a temperature of 50° C. maintained by a water bath. The solution was then filtered to remove calcium carbonate and the filtrate concentrated in vacuo to a syrup weighing 56 grams. The syrup contained 72% solids i.e., d-calcium pantothenate. This syrup was subsequently dissolved in 70 ml. of methanol. To this aqueous methanolic solution of calcium pantothenate, 300 ml. of benzene were added. The resulting materials were then stirred for 16 hours. During stirring, the calcium pantothenate precipitated out of solution and was thereafter filtered and dried in vacuo. In this manner, 33 grams of d-calcium pantothenate were recovered having a bulk density of 0.80 gram per cc.

Example IX

The above example was repeated except that 55 grams of syrup were dissolved in 100 ml. of methyl Cellosolve. 300 mls. of benzene were added to the solution and stirring was carried out overnight. After recovery, 36.7 grams of calcium pantothenate were obtained. This product had a bulk density of 0.58 gram per cc. and a pH of 7.28.

Example X 40 grams of impure l-calcium pantothenate dissolved in 100 ml. of water were treated with carbon dioxide as indicated in Example VIII. Thereafter the solution was concentrated in vacuo to a syrup weighing 56 grams. The syrup was then dissolved in 200 ml. of warm isopropanol. To this solution, 200 ml. of hexane were added. Stirring was carried out for three hours during which time l-calcium pantothenate precipitated out of solution forming a slurry. The slurry was filtered and dried at 55° C. thereby yielding 40 grams of l-calcium pantothenate having a bulk density of 0.69 gram per cc.

As the preceding examples have demonstrated, a novel procedure has been found for increasing the bulk density of calcium pantothenate while at the same time yielding a product in which the pH does not rise significantly upon drying. Furthermore, by carrying out such process, there is no longer any need for precipitating calcium pantothenate from its syrupy concentrate in the form of a hard cake. Thus there is obviated the inconvenient steps of chopping a hard cake of calcium pantothenate out of its container since according to the present invention a freely flowing slurry containing high density calcium pantothenate is produced which may be directly transferred by pipes or the like to a centrifuge and dried to yield a high density product having a pH within the range called for by U.S.P. specifications.

Having thus described our invention what we claim as new and desire to secure by Letters Patent is:

1. A process for increasing the bulk density of calcium pantothenate to at least about 0.49 gram per cc. which comprises the steps of preparing a solution of an optical isomer of partially purified calcium pantothenate selected from the group consisting of d-calcium pantothenate and l-calcium pantothenate in a solvent containing water in an amount of from about 20% to 30% based on the weight of said calcium pantothenate and a first organic liquid material which is miscible with water but immiscible and inert with respect to said calcium pantothenate selected from the group consisting of isopropanol, methanol and ethylene glycol monomethyl ether and thereafter bringing said solution into intimate contact with a second organic liquid material miscible with said solvent but immiscible and inert with respect to said calcium pantothenate, selected from the group consisting of hexane, benzene, iso-propyl acetate and methyl ethyl ketone, thereby precipitating dense calcium pantothenate from solution.

2. The process of claim 1 in which said calcium pantothenate is d-calcium pantothenate.

3. The process of claim 1 in which said calcium pantothenate is l-calcium pantothenate.

4. A process for increasing the bulk density of calcium pantothenate to at least about 0.49 gram per cc. which comprises the steps of preparing a solution of an optical isomer of partially purified calcium pantothenate selected from the group consisting of d-calcium pantothenate and l-calcium pantothenate in a solvent containing water in an amount of from about 20% to 30% based on the weight of said calcium pantothenate and a first organic liquid material which is miscible with water but immiscible and inert with respect to said calcium pantothenate selected from the group consisting of isopropanol, methanol and ethylene glycol monomethyl ether at a temperature of from about 40° to 80° C. and bringing said solution into intimate contact with a second organic liquid miscible with said solvent but immiscible and inert with respect to said calcium pantothenate selected from the group consisting of hexane, benzene, iso-propyl acetate and methyl ethyl ketone, thereby precipitating dense calcium pantothenate from solution.

5. The process of claim 4 in which said first organic liquid present in said aqueous organic solution of calcium pantothenate is present in an amount of from about 300% to 500% by weight of said calcium pantothenate.

6. The process of claim 5 in which said first organic liquid present in said aqueous organic solution of calcium pantothenate is isopropanol.

7. The process of claim 5 in which said first organic liquid present in said aqueous organic solution of calcium pantothenate is methanol.

8. The process of claim 5 in which said second organic liquid is added in an amount of from about 50% to 100% by weight of said aqueous organic solution of calcium pantothenate.

9. The process of claim 8 in which said second organic liquid is hexane.

10. The process of claim 8 in which said second organic liquid is benzene.

11. A process for increasing the bulk density of d-calcium pantothenate to at least about 0.49 gram per cc. which comprises the steps of dissolving a concentrated aqueous solution of partially purified d-calcium pantothenate in from about 300% to 500% by weight of said calcium pantothenate of isopropanol at a temperature of from 40° to 80° C., and bringing the resulting solution into intimate contact with from about 50% to 100% by weight of said solution of hexane, thereby precipitating dense calcium pantothenate from solution.

References Cited in the file of this patent

UNITED STATES PATENTS

| | | |
|---|---|---|
| 2,389,097 | Warnat | Nov. 13, 1945 |
| 2,390,499 | Carlson et al. | Dec. 11, 1945 |
| 2,717,267 | Garbarini | Sept. 6, 1955 |
| 2,848,489 | Kagan | Aug. 19, 1958 |